US006988599B2

(12) United States Patent
Coombs et al.

(10) Patent No.: US 6,988,599 B2
(45) Date of Patent: Jan. 24, 2006

(54) COMPRESSIBLE FLUID STRUT

(75) Inventors: Joshua D. Coombs, Whitmore Lake, MI (US); Jeremy R. Edmondson, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/203,133

(22) PCT Filed: Dec. 7, 2001

(86) PCT No.: PCT/US01/48141

§ 371 (c)(1),
(2), (4) Date: Dec. 2, 2002

(87) PCT Pub. No.: WO02/45980

PCT Pub. Date: Jun. 13, 2002

(65) Prior Publication Data

US 2003/0132071 A1 Jul. 17, 2003

Related U.S. Application Data

(60) Provisional application No. 60/251,951, filed on Dec. 7, 2000.

(51) Int. Cl.
*F16F 9/49* (2006.01)

(52) U.S. Cl. ............. 188/280; 188/299.1; 188/322.15; 267/64.11

(58) Field of Classification Search ............. 267/64.11, 267/64.13, 64.14, 64.15, 64.25, 64.26, 64.28; 188/322.15, 322.19, 322.22, 299.1, 280
See application file for complete search history.

(56) References Cited

U.S. PATENT DOCUMENTS

| | | | | |
|---|---|---|---|---|
| 2,070,440 A | | 2/1937 | Maddin | |
| 2,828,960 A | | 4/1958 | Lucien et al. | |
| 3,154,317 A | | 10/1964 | Gustafsson | |
| 3,603,576 A | * | 9/1971 | Hahn | 267/64.17 |
| 3,627,348 A | * | 12/1971 | Klees | 280/6.159 |
| 3,709,517 A | | 1/1973 | Wossner | |

(Continued)

OTHER PUBLICATIONS

S. Ikenaga et al., *Active Suspension Control Using a Novel Strut and Active Filtered Feedback Design and Implementation*, Proceedings of the 1999 IEEE International Conference on Control Applications, Kohala Coast-Island of Hawaii, Hawaii, Aug. 22-27, 1999, pp. 1502-1508.

(Continued)

*Primary Examiner*—Pam Rodriguez
(74) *Attorney, Agent, or Firm*—Brinks Hofer Gilson & Lione

(57) ABSTRACT

A suspension strut (10) for a vehicle including a compressible fluid (20), a hydraulic tube (22,22') and displacement rod (24) adapted to cooperate with the compressible fluid (20) to supply a suspending spring force that biases the wheel toward the surface, a cavity piston (26,26') separating the inner cavity (30) into a first section (32) and a second section (34) and defining a first orifice (36) adapted to allow flow of the compressible fluid (20) between the first section (32) and the second section (34) of the inner cavity (30), and a first variable restrictor (28) adapted to variably restrict the passage of the compressible fluid (20) through the first orifice (36) based on the velocity of the cavity piston (26,26') to the hydraulic tube (22,22').

19 Claims, 4 Drawing Sheets

U.S. PATENT DOCUMENTS 3,871,635 A 3/1975 Unruh et al.
4,371,317 A 2/1983 Heibel
4,441,593 A * 4/1984 Axthammer ........... 188/322.19
4,589,678 A 5/1986 Lund
4,696,489 A 9/1987 Fujishiro et al.
4,735,402 A 4/1988 Davis
4,809,179 A 2/1989 Klinger et al.
5,011,180 A 4/1991 Dunwoody
5,020,826 A 6/1991 Stecklein et al.
5,137,299 A 8/1992 Jones
5,152,547 A 10/1992 Davis
5,231,583 A 7/1993 Lizell
5,259,738 A 11/1993 Salter et al.
5,316,272 A 5/1994 Davis
5,348,338 A 9/1994 Kuriki et al.
5,522,481 A * 6/1996 Watanabe ................ 188/267.1
5,572,425 A 11/1996 Levitt et al.
5,577,579 A * 11/1996 Derr ........................... 188/315
5,627,751 A 5/1997 Davis et al.
5,769,400 A 6/1998 Holzl et al.
6,145,859 A 11/2000 Altherr et al.
6,264,212 B1 7/2001 Timoney
6,293,530 B1 9/2001 Delorenzis et al.
6,305,673 B1 10/2001 Delorenzis et al.
6,389,341 B1 5/2002 Davis

OTHER PUBLICATIONS

Artemis Intelligent Power Ltd Packet—date unknown.
Dow Corning Packet—date unknown.
UK Search Repor, Feb. 10, 2004.

* cited by examiner

COMPRESSIBLE FLUID STRUT

CROSS-REFERENCE TO RELATED APPLICATIONS

The present this invention claims priority to U.S. provisional application Ser. No. 60/251,951, filed Dec. 7, 2000, entitled "Compressible Fluid Strut".

TECHNICAL FIELD

The subject matter of this invention generally relates to suspension struts for a vehicle and, more particularly, to suspension struts including a compressible fluid.

BACKGROUND OF THE INVENTION

In the typical vehicle, a combination of a coil spring and a gas strut function to allow compression movement of a wheel toward the vehicle and rebound movement of the wheel toward the ground. The suspension struts attempt to provide isolation of the vehicle from the roughness of the road and resistance to the roll of the vehicle during a turn. More specifically, the typical coil spring provides a suspending spring force that biases the wheel toward the ground and the typical gas strut provides a damping force that dampens both the suspending spring force and any impact force imparted by the road. Inherent in every conventional suspension strut is a compromise between ride (the ability to isolate the vehicle from the road surface) and handling (the ability to resist roll of the vehicle). Vehicles are typically engineered for maximum road isolation (found in the luxury market) or for maximum roll resistance (found in the sport car market). There is a need, however, for an improved suspension strut that avoids this inherent compromise.

DETAILED DESCRIPTION OF THE INVENTION

The following description of the three embodiments of the invention is not intended to limit the invention to these preferred embodiments, but rather to enable any person skilled in the art of suspension struts to use this invention.

Figure 1:
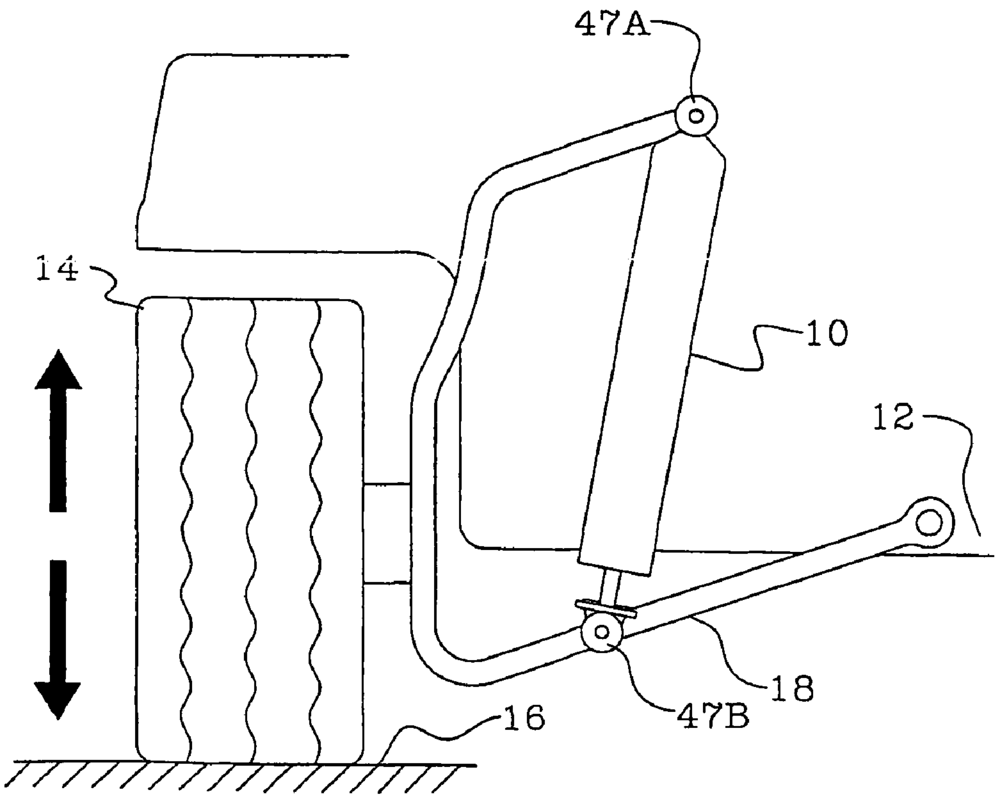
FIG. 1 is a front view of a suspension strut of the preferred embodiment of the invention, shown within a vehicle.

As shown in FIG. 1, the suspension strut 10 of the invention has been specifically designed for a vehicle 12 having a wheel 14 contacting a surface 16 under the vehicle 12 and a suspension link 18 suspending the wheel 14 from the vehicle 12. The suspension link 18 allows compression movement of the wheel 14 toward the vehicle 12 and rebound movement of the wheel 14 toward the surface 16. Despite its design for a particular environment, the suspension strut 10 may be used in any suitable environment.

Figure 2:
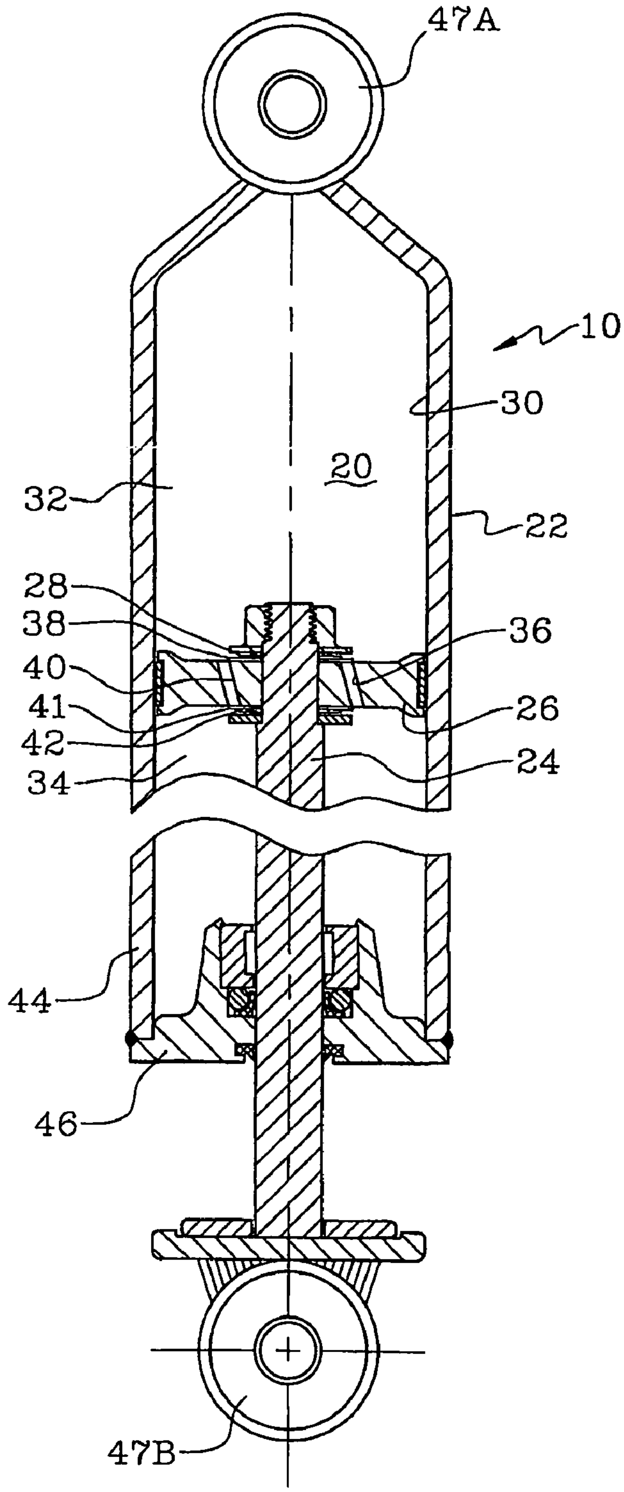
FIG. 2 is a cross-sectional view of the suspension strut of the first preferred embodiment of the invention.

As shown in FIG. 2, the suspension strut 10 of the first preferred embodiment includes a compressible fluid 20, a hydraulic tube 22 and displacement rod 24, a cavity piston 26, and a first variable restrictor 28. The hydraulic tube 22 and the compressible fluid 20 cooperate to supply a suspending spring force that biases the wheel toward the surface, while the cavity piston 26 and the first variable restrictor 28 cooperate to supply a rebound damping force that dampens the suspending spring force. The suspension strut 10, of course, may include other components or systems that do not substantially interfere with the functions and purposes of these components.

The compressible fluid 20 of the first preferred embodiment, which cooperates to supply the suspending spring force, is preferably a silicon fluid that compresses about 1.5% volume at 2,000 psi, about 3% volume at 5,000 psi, and about 6% volume at 10,000 psi. Above 2,000 psi, the compressible fluid 20 has a larger compressibility than conventional hydraulic oil. The compressible fluid 20, however, may alternatively be any suitable fluid, with or without a silicon component, that provides a larger compressibility above 2,000 psi than conventional hydraulic oil.

The hydraulic tube 22 and displacement rod 24 of the first preferred embodiment cooperatively function to couple the suspension link and the vehicle and to allow compression movement of the wheel toward the vehicle and rebound movement of the wheel toward the surface. The hydraulic tube 22 preferably defines an inner cavity 30, which functions to contain a portion of the compressible fluid 20. As previously mentioned, the inner cavity 30 and the compressible fluid 20 preferably cooperate to supply the suspending spring force that biases the wheel toward the surface, and essentially suspends the entire vehicle above the surface. The displacement rod 24 is adapted to move into the inner cavity 30 upon the compression movement of the wheel and to move out of the inner cavity 30 upon the rebound movement of the wheel. As it moves into the inner cavity 30, the displacement rod 24 displaces, and thereby compresses, the compressible fluid 20. In this manner, the movement of the displacement rod 24 into the inner cavity 30 increases the suspending spring force of the suspension strut 10. As the displacement rod 24 moves out of the inner cavity 30, the compressible fluid 20 decompresses and the suspending spring force of the suspension strut 10 decreases. The displacement rod 24 is preferably cylindrically shaped and, because of this preference, the displacement of the displacement rod 24 within the inner cavity 30 and the magnitude of the suspending spring force have a linear relationship. If a linear relationship is not preferred for the particular application of the suspension strut 10, or if there is any other appropriate reason, the displacement rod 24 may be alternatively designed with another suitable shape. The hydraulic tube 22 and the displacement rod 24 are preferably made from conventional steel and with conventional methods, but may alternatively be made from any suitable material and with any suitable method.

The cavity piston 26 of the first preferred embodiment is preferably coupled to the displacement rod 24 and preferably extends to the hydraulic tube 22. In this manner, the cavity piston 26 separates the inner cavity 30 into a first section 32 and a second section 34. The cavity piston 26 defines a first orifice 36, which preferably is between the first section 32 and the second section 34 of the inner cavity 30. The first orifice 36 functions to allow flow of the compressible fluid 20 between the first section 32 and the second section 34 of the inner cavity 30. The cavity piston 26 is preferably securely mounted to the displacement rod 24 by a conventional fastener, but may be alternatively integrally formed with the displacement rod 24 or securely mounted with any suitable device. The cavity piston 26 is preferably made from conventional materials and with conventional methods, but may alternatively be made from other suitable materials and with other suitable methods.

The first variable restrictor 28 of the first preferred embodiment is coupled to the cavity piston 26 near the first orifice 36. The first variable restrictor 28 functions to restrict the passage of the compressible fluid 20 through the first orifice 36 and, more specifically, functions to variably restrict the passage based on the velocity of the cavity piston 26 relative to the hydraulic tube 22. In the first preferred embodiment, the first variable restrictor 28 is a first shim stack 38 preferably made from conventional materials and with conventional methods. In alternative embodiments, the first variable restrictor 28 may include any other suitable device able to variably restrict the passage of the compressible fluid 20 through the first orifice 36 based on the velocity of the cavity piston 26 relative to the hydraulic tube 22.

In the first preferred embodiment of the invention, the cavity piston 26 also defines a second orifice 40, which—like the first orifice 36—preferably extends between the first section 32 and the second section 34 of the inner cavity 30 and functions to allow flow of the compressible fluid 20 between the first section 32 and the second section 34 of the inner cavity 30. Further, the suspension strut 10 of the first preferred embodiment also includes a second variable restrictor 41 coupled to the cavity piston 26 near the second orifice 40. The second variable restrictor 41—like the first variable restrictor 28—functions to restrict the passage of the compressible fluid 20 through the second orifice 40 and, more specifically, functions to variably restrict the passage based on the velocity of the cavity piston 26 relative to the hydraulic tube 22.

In the preferred embodiment, the second variable restrictor 41 is a second shim stack 42 preferably made from conventional materials and with conventional methods. In alternative embodiments, the second variable restrictor may include any suitable device able to variably restrict a passage of the compressible fluid 20 through the second orifice 40 based on the velocity of the cavity piston 26 relative to the hydraulic tube 22.

The cavity piston 26, the first orifice 36, and the first variable restrictor 28 of the first preferred embodiment cooperate to supply the rebound damping force during the rebound movement of the wheel. The rebound damping force acts to dampen the suspending spring force that tends to push the displacement rod 24 out of the hydraulic tube 22. The cavity piston 26, the second orifice 40, and a second variable restrictor 41, on the other hand, cooperate to supply the compression damping force during the compression movement of the wheel. The compression damping force acts to dampen any impact force that tends to push the displacement rod 24 into the,hydraulic tube 22.

The hydraulic tube 22 of the first preferred embodiment includes a first portion 44 and a second portion 46, which aids in the assembly of the suspension strut 10. During the assembly, the second portion 46 of the hydraulic tube 22 is slid over the displacement rod 24 and the cavity piston 26 is mounted to the displacement rod 24, preferably with a fastener. Then, the cavity piston 26 is slid into the first portion 44 of the hydraulic tube 22 and the second portion 46 of the hydraulic tube 22 is fastened to the first portion 44, preferably with a weld. The suspension strut 10 of the first preferred embodiment also includes bearings and seals between the sliding elements of the suspension strut 10.

As shown in FIGS. 1 and 2, the suspension strut 10 of the first preferred embodiment also includes a first connector 47A and a second connector 47B. In the preferred embodiment, the connectors 47A and 47B are made from a structural material that firmly mounts the suspension strut 10 to the vehicle 12 without any substantial compliancy. In this manner, the suspension strut 10 provides all of the isolation between the vehicle 12 and the suspension link 18. In alternative embodiments, either the first connector 47A, the second connector 47B, or both connectors 47A and 47B may include elastic material that connects the suspension strut 10 to the vehicle 12 with some compliancy. In this manner, the suspension strut 10 and the connectors 47A and 47B act in a series to provide the isolation between the vehicle 12 and the suspension link 18. The connectors 47A and 47B are preferably made with conventional materials and from conventional methods, but may alternatively be made with any suitable material and from any suitable method.

Figure 3:
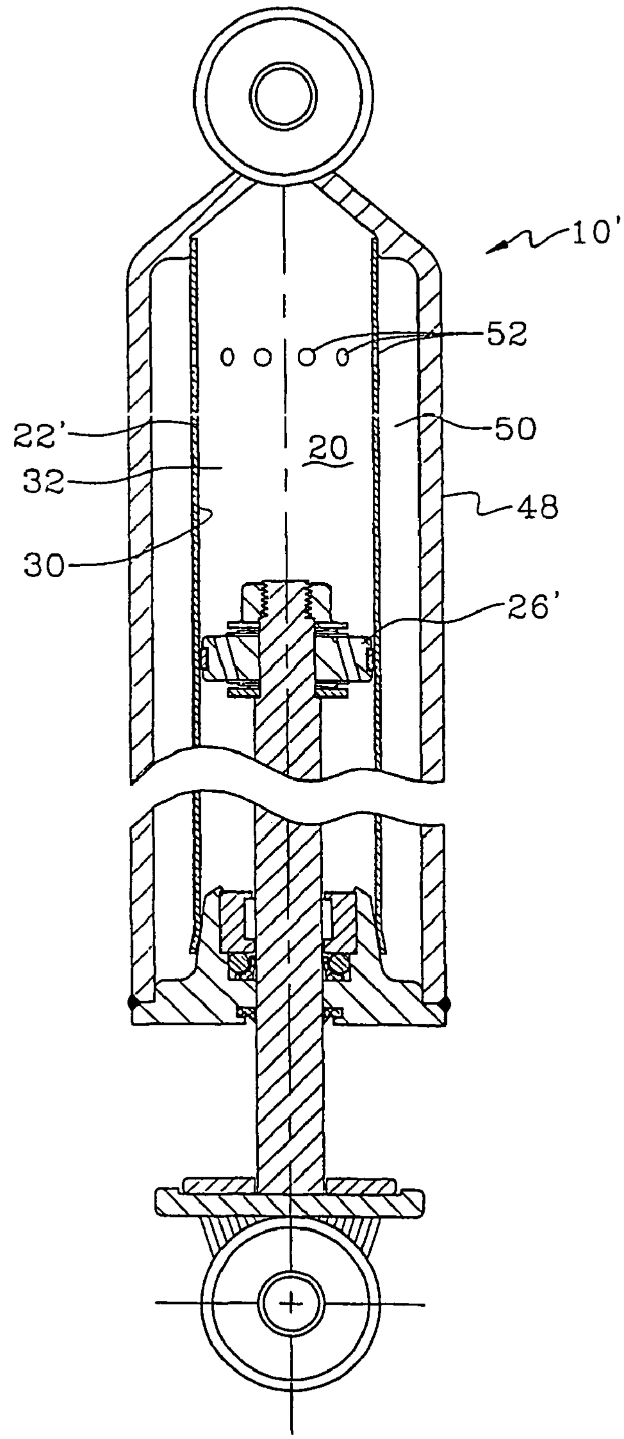
FIG. 3 is a cross-sectional view of a suspension strut of the second preferred embodiment of the invention.

As shown in FIG. 3, in addition to the components of the suspension strut 10 of the first preferred embodiment, the suspension strut 10' of the second preferred embodiment includes a pressure vessel 48. The pressure vessel 48 cooperates with a modified hydraulic tube 22' to define an outer cavity 50 located between hydraulic tube 22' and the pressure vessel 48. The hydraulic tube 22' defines a tube opening 52, which functions to fluidly connect the first section 32 of the inner cavity 30 and the outer cavity 50. Effectively, the presence of the tube opening 52 within the hydraulic tube 22' and the pressure vessel 48 around the hydraulic tube 22' greatly expands the volume of compressible fluid 20 on the "compression side" of the cavity piston 26'. In this manner, the size of the hydraulic tube 22' and the size of the pressure vessel 48 may be adjusted to optimize the suspending spring force of the suspension strut 10'. In an alternative embodiment, the hydraulic tube 22' may define a tube opening to fluidly connect the second section 34 of the inner cavity 30 and the outer cavity 50 which would greatly expand the volume of compressible fluid 20 on the "rebound side" of the cavity piston 26'. In all other aspects, the suspension strut 10' of the second preferred embodiment is similar to the suspension strut 10 of the first preferred embodiment.

Figure 4:
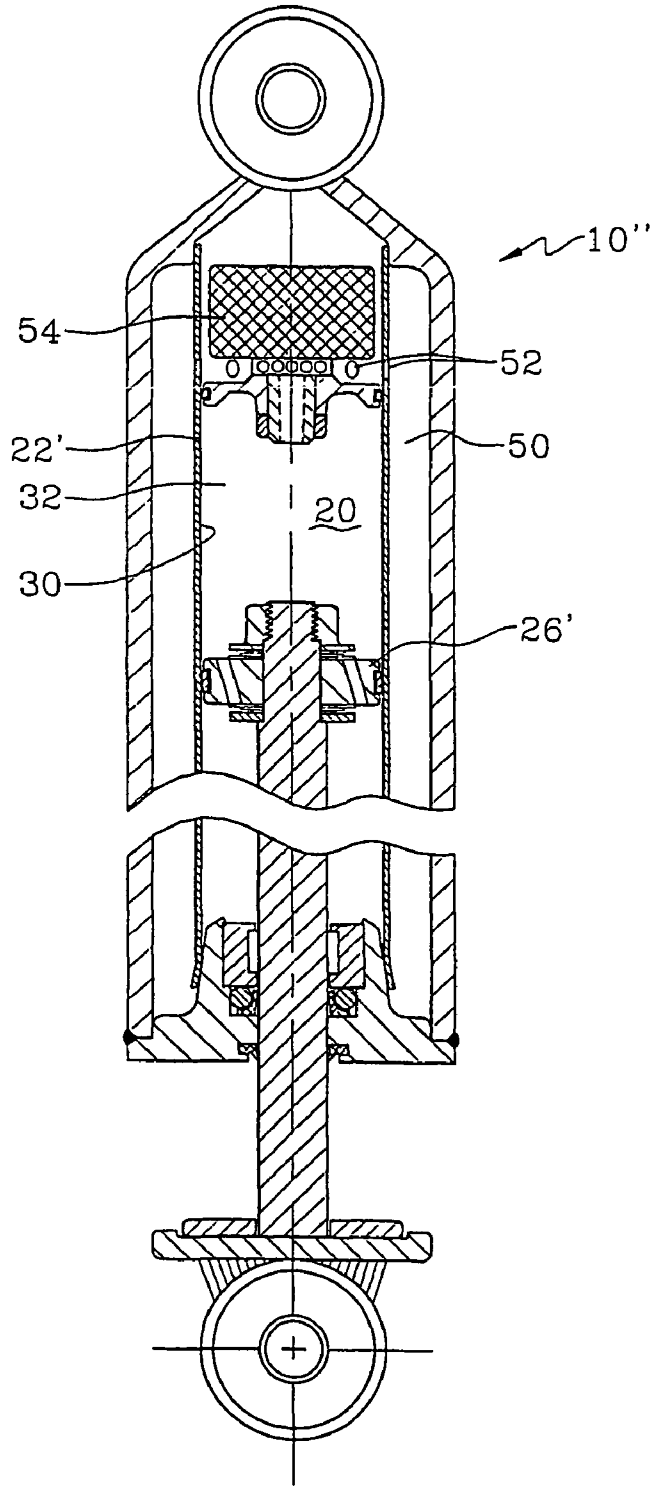
FIG. 4 is a cross-sectional view of a suspension strut of the third preferred embodiment of the invention.

As shown in FIG. 4, in addition to the components of the suspension strut 10' of the second preferred embodiment, the suspension strut 10" of the third preferred embodiment includes a controllable valve 54 near the tube opening 52 of the hydraulic tube 22'. The controllable valve 54 functions to selectively restrict passage of the compressible fluid 20 between the first section 32 of the inner cavity 30 and the outer cavity 50. The presence or absence of the connection between the first section 32 of the inner cavity 30 and the outer cavity 50 dramatically affects the suspending spring force of the suspension strut 10".

The suspension strut 10" of the third preferred embodiment also preferably includes an electric control unit (not shown) coupled to the controllable valve 54. The electric control unit functions to selectively activate the controllable valve 54. Because selective activation of the controllable valve 54 dramatically affects volume of the compressible fluid 20 on the "compression side" of the cavity piston 26', the electric control unit can actively modulate the suspending spring force, the rebound damping force, and the compression damping force to achieve the desired ride and handling for the vehicle. For example, as the vehicle encounters a harsh impact force, or a fast turn, the electric control unit may close the controllable valve 54 thereby decreasing the volume of the compressible fluid 20 on the "compression side" of the cavity piston 26'. This response may achieve the desired ride and handling for the vehicle. Both the controllable valve 54 and the electric control unit are preferably conventional devices, but may alternatively be any suitable device to selectively restrict the passage of compressible fluid.

As any person skilled in the art of suspension struts will recognize from the previous description and from the figures and claims, modifications and changes can be made to the three preferred embodiment of the invention without departing from the scope of this invention defined in the following claims.

We claim:

1. A suspension strut for a vehicle having a wheel contacting a surface under the vehicle and a suspension link suspending the wheel from the vehicle and allowing compression movement of the wheel toward the vehicle and rebound movement of the wheel toward the surface, said suspension strut comprising:

a compressible fluid;

a hydraulic tube and displacement rod adapted to couple the suspension link and the vehicle, said hydraulic tube defining an inner cavity adapted to contain a portion of said compressible fluid and to cooperate with said compressible fluid to supply a suspending spring force that biases the wheel toward the surface, said displacement rod adapted to move into said inner cavity upon the compression movement of the wheel and to move out of said inner cavity upon the rebound movement of the wheel;

a cavity piston coupled to said displacement rod and extending to said hydraulic tube thereby separating said inner cavity into a first section and a second section, said cavity piston defining a first orifice adapted to allow flow of said compressible fluid between said first section and said second section of said inner cavity;

a first variable restrictor coupled to said cavity piston and adapted to variably restrict the passage of said compressible fluid through said first orifice based on the velocity of said cavity piston relative to said hydraulic tube;

wherein said cavity piston, said first orifice, and said first variable restrictor cooperate to supply a rebound damping force during the rebound movement of the wheel;

a pressure vessel defining an outer cavity located between said pressure vessel and said hydraulic tube and adapted to contain a portion of said compressible fluid; wherein said hydraulic tube has a sidewall defining a tube opening adapted to fluidly connect said first section of said inner cavity and said outer cavity; and wherein said hydraulic fluid in said first section of said inner cavity and said outer cavity cooperate to simultaneously supply the suspending spring force; and a controllable valve adapted to selectively restrict passage of said compressible fluid between said first section of said inner cavity and said outer cavity, the controllable valve being normally open and actuated to restrict the passage of the compressible fluid between said first section of said inner cavity and said outer cavity.

2. The suspension strut of claim 1 wherein said compressible fluid includes a silicone fluid.

3. The suspension strut of claim 1 wherein said compressible fluid has a larger compressibility above 2,000 psi than hydraulic oil.

4. The suspension strut of claim 1 wherein said compressible fluid is adapted to compress about 1.5% volume at 2,000 psi, about 3% volume at 5,000 psi, and about 6% volume at 10,000 psi.

5. The suspension strut of claim 1 wherein said first variable restrictor is a first shim stack.

6. The suspension strut of claim 1 wherein said cavity piston defines a second orifice adapted to allow passage of said compressible fluid between said first section and said second section of said inner cavity.

7. The suspension strut of claim 6 further comprising a second variable restrictor coupled to said cavity piston and adapted to variably restrict the passage of said compressible fluid through said second orifice based on the velocity of said cavity piston relative to said hydraulic tube.

8. The suspension strut of claim 7 wherein said cavity piston, said second orifice, and said second variable restrictor cooperate to supply a compression damping force during the compression movement of the wheel.

9. The suspension strut of claim 8 wherein said second variable restrictor is a second shim stack.

10. The suspension strut of claim 1 further comprising an electric control unit adapted to selectively activate said controllable valve, thereby actively modulating the suspending spring force.

11. The suspension strut of claim 1 wherein said electric control unit is further adapted to selectively actuate said controllable valve, thereby actively modulating the rebound damping force.

12. The suspension strut of claim 1 wherein said electric control unit is further adapted to selectively actuate said controllable valve, thereby actively modulating the compression damping force.

13. The suspension strut of claim 1 where said outer cavity and said inner cavity are concentrically located.

14. The suspension strut of claim 1 wherein the controllable valve is positioned entirely inside the hydraulic tube.

15. The suspension strut of claim 1 wherein the controllable valve includes an inlet in communication with the first section of the inner cavity and an outlet in communication with the tube opening and the outer cavity.

16. The suspension strut of claim 1 wherein the controllable valve regulates flow from the inner cavity to the outer cavity, and regulates flow from the outer cavity to the inner cavity.

17. The suspension strut of claim 1 wherein the controllable valve is situated in the first section of the inner cavity and divides the first section into third and fourth sections, the fourth section in fluid communication with the outer cavity via the tube opening, the controllable value regulating flow between the third and fourth sections.

18. The suspension strut of claim 1 wherein the sidewall does not intersect a longitudinal axis of the tube.

19. The suspension strut of claim 1 wherein the suspension strut does not include a pump or motor, and does not include a check valve.

* * * * *